US011474874B2

(12) United States Patent
Sarma et al.

(10) Patent No.: US 11,474,874 B2
(45) Date of Patent: Oct. 18, 2022

(54) SYSTEMS AND METHODS FOR AUTO-SCALING A BIG DATA SYSTEM

(71) Applicants: Joydeep Sen Sarma, Bangalore (IN); Mayank Ahuja, Bangalore (IN); Sivaramakrishnan Narayanan, Bangalore (IN); Shrikanth Shankar, Mountain View, CA (US)

(72) Inventors: Joydeep Sen Sarma, Bangalore (IN); Mayank Ahuja, Bangalore (IN); Sivaramakrishnan Narayanan, Bangalore (IN); Shrikanth Shankar, Mountain View, CA (US)

(73) Assignee: QUBOLE, INC., Mountain View, CA (US)

( * ) Notice: Subject to any disclaimer, the term of this patent is extended or adjusted under 35 U.S.C. 154(b) by 0 days.

(21) Appl. No.: 14/459,631

(22) Filed: Aug. 14, 2014

(65) Prior Publication Data
US 2016/0048415 A1     Feb. 18, 2016

(51) Int. Cl.
*G06F 9/50* (2006.01)

(52) U.S. Cl.
CPC .......... *G06F 9/5083* (2013.01); *G06F 9/5072* (2013.01)

(58) Field of Classification Search
CPC combination set(s) only.
See application file for complete search history.

(56) References Cited

U.S. PATENT DOCUMENTS

| | | | |
|---|---|---|---|
| 5,603,001 A | 2/1997 | Sukegawa et al. | |
| 5,907,675 A | 5/1999 | Aahlad | |
| 6,192,391 B1 | 2/2001 | Ohtani | |
| 6,460,027 B1 | 10/2002 | Cochrane et al. | |
| 6,601,062 B1 | 7/2003 | Deshpande et al. | |
| 6,847,962 B1 | 1/2005 | Cochrane et al. | |
| 7,680,994 B2 * | 3/2010 | Buah ................... | G06F 11/2069 711/156 |
| 7,844,853 B2 * | 11/2010 | Barsness ............. | G06F 11/1438 714/19 |

(Continued)

OTHER PUBLICATIONS

Kamal Kc et al.; Dynamically controlling node-level parallelism in Hadoop; IEEE; pp. 309-316; retrieved on May 28, 2022 (Year: 2015).*

(Continued)

*Primary Examiner* — Thuy Dao
*Assistant Examiner* — Cuong V Luu
(74) *Attorney, Agent, or Firm* — Landmark IP Law; Gregory Murphy

(57) ABSTRACT

Systems and methods for automatically scaling a big data system. Methods include determining, at a first time, a first number of nodes for a cluster to process a request; assigning an amount of nodes equal to the first number of nodes to the cluster; determining a rate of progress of the request; determining, at a second time based on the rate of progress a second number of nodes; and modifying the amount of nodes to equal the second number of nodes. Systems include a cluster manager, to add and/or remove any nodes; the big data system, to process requests that utilize the cluster and nodes, and an automatic scaling cluster manager including a big data interface for communicating with the big data system; a cluster manager interface for communicating with the cluster manager; and a cluster state machine.

8 Claims, 4 Drawing Sheets

(56) References Cited

U.S. PATENT DOCUMENTS

| | | | |
|---|---|---|---|
| 7,848,261 B2* | 12/2010 | Fachan | H04L 67/1002 370/255 |
| 8,260,840 B1 | 9/2012 | Sirota et al. | |
| 8,296,419 B1* | 10/2012 | Khanna | G06F 9/5072 709/201 |
| 8,996,482 B1 | 3/2015 | Singh et al. | |
| 9,049,746 B2* | 6/2015 | Periyalwar | H04W 88/06 |
| 9,451,013 B1 | 9/2016 | Roth et al. | |
| 9,483,785 B1 | 11/2016 | Corley et al. | |
| 9,531,607 B1 | 12/2016 | Pai et al. | |
| 9,571,561 B2* | 2/2017 | Jang | H04L 67/10 |
| 9,645,859 B1* | 5/2017 | Dash | G06F 3/00 |
| 9,860,569 B1 | 1/2018 | Wilms et al. | |
| 9,870,269 B1* | 1/2018 | Viswanathan | G06F 9/5055 |
| 10,069,693 B1 | 9/2018 | Daptardar et al. | |
| 2002/0145983 A1 | 10/2002 | Block et al. | |
| 2002/0157113 A1 | 10/2002 | Allegrezza | |
| 2003/0005350 A1* | 1/2003 | Koning | H04L 67/1002 714/4.11 |
| 2003/0065874 A1 | 4/2003 | Marron et al. | |
| 2004/0193626 A1 | 9/2004 | Colby et al. | |
| 2005/0222996 A1 | 10/2005 | Yalamanchi | |
| 2005/0278387 A1 | 12/2005 | Kamada et al. | |
| 2007/0094290 A1 | 4/2007 | Oka et al. | |
| 2007/0195810 A1* | 8/2007 | Fachan | H04L 67/1002 370/432 |
| 2007/0294493 A1* | 12/2007 | Buah | G06F 11/2069 711/156 |
| 2008/0141065 A1 | 6/2008 | Okabe | |
| 2009/0043873 A1* | 2/2009 | Barsness | G06F 11/1438 709/223 |
| 2009/0182779 A1 | 7/2009 | Johnson | |
| 2009/0222418 A1 | 9/2009 | Layman | |
| 2009/0327854 A1 | 12/2009 | Chhajer et al. | |
| 2010/0153482 A1 | 6/2010 | Kim et al. | |
| 2010/0306286 A1 | 12/2010 | Chiu et al. | |
| 2011/0119449 A1 | 5/2011 | Neerincx et al. | |
| 2011/0167221 A1 | 7/2011 | Pangal et al. | |
| 2011/0314485 A1 | 12/2011 | Abed | |
| 2012/0047339 A1 | 2/2012 | Decasper et al. | |
| 2012/0102291 A1 | 4/2012 | Cherian et al. | |
| 2012/0151272 A1 | 6/2012 | Behrendt et al. | |
| 2012/0215763 A1 | 8/2012 | Hughes et al. | |
| 2012/0304192 A1 | 11/2012 | Grove et al. | |
| 2013/0110764 A1 | 5/2013 | Wilf | |
| 2013/0124483 A1 | 5/2013 | Furuhashi et al. | |
| 2013/0132967 A1 | 5/2013 | Soundararajan et al. | |
| 2013/0179881 A1 | 7/2013 | Calder et al. | |
| 2013/0189969 A1* | 7/2013 | Periyalwar | H04W 76/046 455/418 |
| 2013/0204948 A1 | 8/2013 | Zeyliger et al. | |
| 2013/0227558 A1 | 8/2013 | Du et al. | |
| 2013/0232254 A1 | 9/2013 | Srikanth et al. | |
| 2013/0254171 A1 | 9/2013 | Grondin et al. | |
| 2013/0290771 A1 | 10/2013 | Kim et al. | |
| 2013/0312000 A1* | 11/2013 | Helander | G06F 9/4887 718/104 |
| 2013/0318379 A1 | 11/2013 | Seshadri et al. | |
| 2013/0332612 A1 | 12/2013 | Cai et al. | |
| 2014/0040575 A1 | 2/2014 | Horn | |
| 2014/0059306 A1 | 2/2014 | Bender et al. | |
| 2014/0059552 A1 | 2/2014 | Cunningham et al. | |
| 2014/0067992 A1 | 3/2014 | Saeki | |
| 2014/0095505 A1 | 4/2014 | Blanchflower et al. | |
| 2014/0149590 A1 | 5/2014 | Mallipeddi et al. | |
| 2014/0156777 A1 | 6/2014 | Subbiah et al. | |
| 2014/0189109 A1* | 7/2014 | Jang | H04L 67/10 709/224 |
| 2014/0195558 A1 | 7/2014 | Murthy et al. | |
| 2014/0279838 A1 | 9/2014 | Tsirogiannis et al. | |
| 2015/0222705 A1 | 8/2015 | Stephens | |
| 2015/0234688 A1 | 8/2015 | Dageville et al. | |
| 2015/0242197 A1* | 8/2015 | Alfonso | G06F 8/65 717/173 |
| 2015/0379026 A1 | 12/2015 | Todd et al. | |
| 2016/0065627 A1 | 3/2016 | Pearl et al. | |
| 2016/0179581 A1 | 6/2016 | Soundararajan et al. | |
| 2016/0224638 A1 | 8/2016 | Bestler et al. | |
| 2016/0350371 A1 | 12/2016 | Das et al. | |
| 2016/0371193 A1 | 12/2016 | Floratou et al. | |
| 2017/0337138 A1 | 11/2017 | Li et al. | |
| 2018/0159727 A1 | 6/2018 | Liu et al. | |

OTHER PUBLICATIONS

Jinhua Hu et al.; A Scheduling Strategy on Load Balancing of Virtual Machine Resources in Cloud Computing Environment; IEEE; pp. 89-96; retrieved on May 28, 2022 (Year: 2010).*

International Search Report completed Oct. 2, 2015 for PCT/US15/45419; 2 pages.

International Preliminary Report on Patentability dated Feb. 14, 2017; 6 pages.

International Search Report for PCT/US2015/045419 completed Oct. 2, 2015; 2 pages.

International Search Report for PCT/US2015/050174 completed Nov. 16, 2015; 2 pages.

International Search Report for PCT/US2015/057003 completed Dec. 13, 2015; 2 pages.

* cited by examiner

SYSTEMS AND METHODS FOR AUTO-SCALING A BIG DATA SYSTEM

FIELD OF THE INVENTION

In general, the present invention is directed to a system and method for auto-scaling a big data system comprising a master computer and a plurality of worker nodes. More specifically, the present invention is directed to systems and methods for automatically scaling a big data system in order to utilize additional resources when available, release unneeded nodes in a manner that does not impact current jobs or queries, and/or deal with transient failures of master or worker nodes.

BACKGROUND

The term "Big Data" generally refers to a collection of data sets that may be difficult to process using traditional data processing applications due to its size and/or complexity. Due to its size, processes to capture, process, manage, and/or curate the data within a reasonable time may be quite difficult. Big Data has been defined to include a high volume of data, high velocity processing speed, high variety of information, and high veracity or accuracy of information and analytics.

Big Data may be utilized in virtually any service or product. Ranging from science and research applications (such as, for example, data collected by the Large Hadron Collider, or information related to the human genome) to those in everyday life (such as, for example, services provided by Facebook, Amazon, eBay), the ability to process Big Data and determine meaningful conclusions therefrom is becoming a necessity. According to a 2013 study, Big Data and its analytics is on average the $9^{th}$ priority for the 2,053 Chief Information Officers surveyed. (See Gartner Executive Program Survey, 2013).

As Big Data has grown, computing resources necessary to efficiently handle such data is required. Due to certain constraints—ranging from cost to physical space—cloud computing has provided resources that can be tapped in order to process Big Data. Big Data systems may be quite powerful and may process petabytes of data and run on upwards of thousands of machines. However, there are periods when such systems are underutilized and other periods when such systems are over-taxed. Accordingly, it is desirable to have a Big Data system that can be adapt to workload and scale up and down, thereby leading to better utilization of resources and reducing costs.

Cloud computing has what can be referred to as an elastic property, in that virtual machines in the cloud can be used on-demand on an as-needed basis, thereby providing resources that are suitable for specific processing tasks or functions. However, the flexibility of resources in a cloud computing environment can be difficult to control. Determining the proper amount of resources at the outset of an activity can be difficult, particularly when the loads of certain applications fluctuate. Accordingly, it is desirable to provide systems and methods that can auto-scale a Big Data system in order to (i) use more resources; (ii) utilize additional machines when available; (iii) select and release nodes; (iv) release nodes in manners so as to not impact current jobs or queries; and/or (v) deal with transient failures, including restarts, of master or worker nodes.

SUMMARY OF THE INVENTION

Aspects in accordance with some embodiments of the present invention may include a method for automatically scaling a big data system, comprising: determining, at a first point in time, a first optimal number of nodes for a cluster to adequately process a request; assigning an amount of nodes equal to the first optimal number of nodes to the cluster to process the request; determining, a rate of progress of the request; determining, at a second point in time and based on the rate of progress of the request, a second optimal number of nodes for the cluster to adequately process the request; and modifying the number of nodes assigned to the cluster to process the request to equal the second optimal number of nodes.

Other aspects in accordance with some embodiments of the present invention may include a method of automatically down-scaling nodes assigned to a cluster to process a request in a big data system, comprising: identifying each node in a cluster as being in a state of: unknown, running, requested for quiesce, or quiesced; reassigning the state of a node previously identified as unknown as requested for quiesce if such node remains in the unknown state for longer than an acceptable amount of time; determining if nodes requested for quiesce have completed any assigned processing or tasks, and upon such completion reassigning such nodes to a quiesced state; terminating from the cluster any nodes in a quiesced state.

Some other aspects in accordance with some embodiments of the present invention may include a system for automatically scaling a big data system, comprising: an automatic scaling cluster manager, comprising: a big data interface, for selectively communicating with the big data system; a cluster manager interface, for selectively communicating with a cluster manager instructions for adding and/or removing nodes from a cluster used to process a request; and a cluster state machine; a cluster manager, configured to add and/or remove nodes; and a big data system, configured to process requests that utilize the cluster and nodes.

Some other aspects in accordance with some embodiments of the present invention may include a method for automatically scaling hardware used to process transactions for multiple big data systems running on the same hardware, comprising: determining, at a first point in time, a first optimal number of nodes for a cluster to adequately process a request; assigning an amount of nodes equal to the first optimal number of nodes to the cluster to process the request; determining, a rate of progress of the request; determining, at a second point in time and based on the rate of progress of the request, a second optimal number of nodes for the cluster to adequately process the request; and modifying the number of nodes assigned to the cluster to process the request to equal the second optimal number of nodes, wherein: if the second optimal number of nodes is greater than the first optimal number of nodes, assigning addition nodes to the cluster to process the request; or if the second optimal number of nodes is less than the first optimal number of nodes, requesting a number of nodes equal to the difference between the first optimal number of nodes and the second optimal number of nodes be quiesced; and determining if a node to be quiesced has completed any assigned processing or task for any of the big data systems operating on the hardware; and if the node requested to be quiesced has not completed any assigned processing or task, allowing the node requested to be quiesced to complete any assigned processing or task before terminating the node from the cluster; or if the node requested to be quiesced has completed any assigned processing or task for any of the big data systems operating on the hardware, terminating the quiesced nodes from the cluster.

These and other aspects will become apparent from the following description of the invention taken in conjunction with the following drawings, although variations and modifications may be effected without departing from the spirit and scope of the novel concepts of the invention.

BRIEF DESCRIPTION OF THE DRAWINGS

The present invention can be more fully understood by reading the following detailed description together with the accompanying drawings, in which like reference indicators are used to designate like elements. The accompanying figures depict certain illustrative embodiments and may aid in understanding the following detailed description. Before any embodiment of the invention is explained in detail, it is to be understood that the invention is not limited in its application to the details of construction and the arrangements of components set forth in the following description or illustrated in the drawings. The embodiments depicted are to be understood as exemplary and in no way limiting of the overall scope of the invention. Also, it is to be understood that the phraseology and terminology used herein is for the purpose of description and should not be regarded as limiting. The detailed description will make reference to the following figures, in which.

Figure 1:
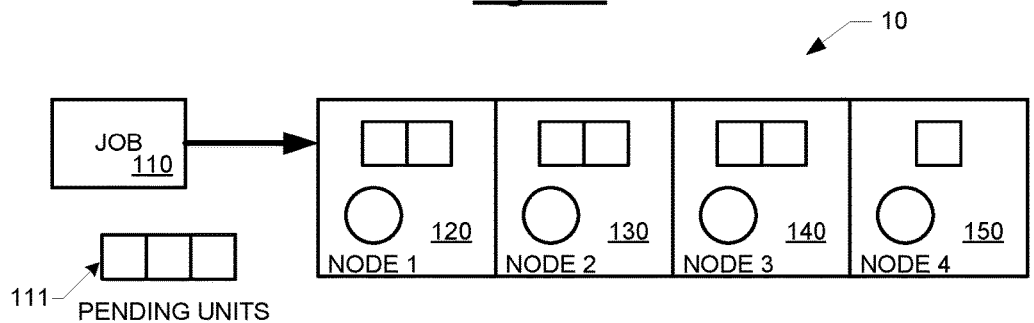
FIG. 1 sets forth a diagram depicting the use of various nodes with pending units of work remaining, in accordance with some embodiments of the present invention.

Before any embodiment of the invention is explained in detail, it is to be understood that the present invention is not limited in its application to the details of construction and the arrangements of components set forth in the following description or illustrated in the drawings. The present invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness. Moreover, as used herein, the singular may be interpreted in the plural, and alternately, any term in the plural may be interpreted to be in the singular.

In general, a Big Data system may comprise a master computer and a plurality of worker nodes working cohesively to achieve a single goal. For example, a master computer may work with a plurality of worker nodes to execute a query in a distributed fashion. In order to effectuate this task, the execution of the query (or other jobs) may be broken into small units and assigned to individual nodes. Each node may then process one or more units at a time and receive more work when the node is free.

With reference to FIG. 1, a graphic representation of a system 10 in which a job is submitted that may be handled by multiple nodes. System 10 may comprise four nodes: node 1-120, node 2-130, node 3-140, and node 4-150. Each node may offer two units of processing capability. It can be seen that job 110 may require ten (10) units of processing. Nodes 1-3 each are currently shown to be processing two (2) units a piece, while node 4 processes a single unit. There are still three (3) pending units 111 that will be distributed amongst nodes 1-4 when they are free. Accordingly, it can be seen that an additional node would help speed up the overall response time of job 110, as each node working at capacity would only have to process two (2) units.

Accordingly, it can be seen from FIG. 1 that the ability to adapt nodes to certain demands of processing and/or work is highly desirable in order to increase efficiency while reducing time required and, relatedly, cost required.

Figure 2:
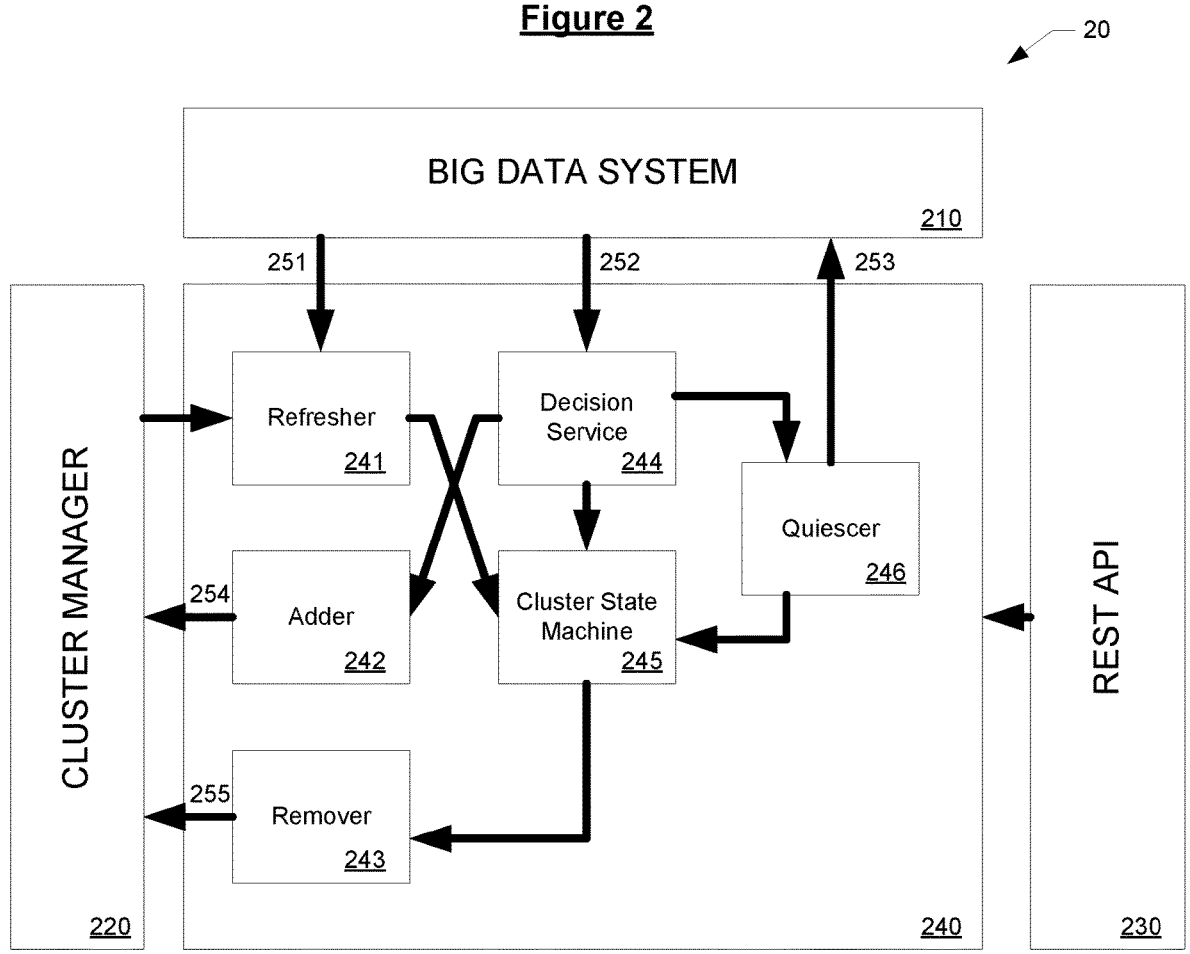
FIG. 2 illustrates an exemplary architecture and design of an auto-scaling Big Data system, in accordance with some embodiments of the present invention.

With reference to FIG. 2, a system 20 in accordance with some embodiments of the present invention will now be discussed. System 20 may be used to auto-scale systems used to process Big Data. System 20 may comprise, in general, a Big Data System 210, a cluster manager 220, Rest APIs 230, and Auto-Scaling Cluster Manager 240.

Big Data system 210 may comprise a big data system—such as, for example, Hadoop, an open source Apache licensed implementation of MapReduce, a programming model and associated implementation for processing large data sets based on work by Google. In general, MapReduce takes a single programming task (termed a map task) and divides it into subtasks (which may be identical) that is distributed amongst multiple machines, or nodes. This framework may provide a parallel processing model in which queries are split and distributed across parallel nodes and processed in parallel (that is, "Map"), and then gathered and delivered (that is, "reduced"). Note that as Big Data sets grew, query latency often similarly grew.

Alternatively, Big Data system 210 may be, for example, Presto. In general, Presto is a distributed system that runs on a cluster of machines, including a coordinator and multiple workers. More specifically, Presto is a distributed SQL query engine that may be optimized for ad-hoc analysis at interactive speed. Queries may be submitted to the coordinator, which may parse, analyze, and plan a query execution, and then distribute the processing to the worker nodes. Unlike MapReduce, Hadoop, and Hive, Presto may utilize a customer query and execution engine with operators designed to support SQL semantics. In this manner, all processing may be in memory and pipelined across the network between stages. This pipelined execution model may run multiple stages at one time, and stream data from one stage to the next as it becomes available. In this manner, unnecessary input/output (I/O) and/or associated latency overhead may be avoided, and end-to-end latency for various queries may be greatly reduced. Note that Presto may be utilized to access data stored in Hive, Hadoop Distributed File System, Amazon Web Services, relational database management systems, and other data sources.

With continued reference to FIG. 2 Big Data system 210 may perform, for example, (i) getClusterinfo( )251 with refresher service of the Auto Scaling Cluster Manager; (ii) getProgressReport( ) 252 with the Decision Service Module of the Auto Scaling Cluster Manager; and (iii) quesce( ). Each of these will be discussed below.

Big Data system 210 may interact with Auto Scaling Cluster Manager 240 to perform multiple tasks. For example, the Auto Scaling Cluster Manager 240 may require the following contract from the Big Data System 210:

```
Public interface BigDataSystem {
    Public ClusterInfo getClusterInfo( ):
    Public void quiesce(String nodeId);
    Public ProgressReport getProgressReport( );
}
```

Big Data System 210 may communicate with the cluster manager 220. Big Data system 210 may be responsible for sharing its view of the cluster. Note that in accordance with some embodiments of the present invention, some nodes returned by the cluster manager 220 may be "bad," and may not be identified or listed by the Big Data system 210. The RefresherService 241 may compare lists between the Big Data system 210 and the Cluster Manager 220 in order to identify bad nodes.

"getProgressReport( )" 252 may provide a report indicating how much work is left in the system. A progress report may comprise a number of work reports, wherein each work is typically a query or a job). Every work may indicate how many units are unassigned to any node, and how many units have been assigned to each node. An exemplary progress report is repeated below.

```
{
    "when" : "2014-07-21 14:27:44,"
    "workReports":[{
        "workId" : "w1"
        "left" : 40
        "running" : {
            "n1" : 1,
            "n2" : 2
        },
        "started" " 2014-07-23 15:37:56"
    },{
        "workId" : "w2"
        "left" : 50
        "running" : {
            "n1" : 2,
            "n2" : 1
        },
        "started" : "2014-07-23 "16:34:36"
    }]
}
```

In a Presto environment, each workload may correspond to a query. "Left" may correspond to pending source splits and "Assigned" may correspond to a split being executed by a node. In a Hadoop environment, running units on a node may correspond to a number of map or reduce tasks on the node for a particular job.

Note that the Big Data system 210 must support a quiesce operation in order to disable a node. Once the Big Data system 210 has requested to quiesce a node, the node will eventually stop receiving any work and will only complete existing work assigned to the node. Once the Big Data system 210 is requested to quiesce a node (as discussed below), the number of running units of work in such node should eventually decrease to zero (0). Once the number of running units of work becomes zero (0), the node is no longer being used by the system. This would be evident from the progress report.

Note that nodes may be quiesced and removed for any number of reasons. For example, a node may be quiesced if it is idle, if—in the case where nodes may be purchased, rented, or leased in discrete time periods—the node is approaching a lease boundary, or if there are alternative nodes that are less expensive.

Cluster manager 220 may be responsible for communicating with a cloud provider (for example, a public cloud provider) in order to procure or delete nodes. Cluster manager 220 may also obtain a full list of nodes that it believes are part of the cluster. The cluster manager 220 may be, for example, based on hustler that may work in the context of Amazon Web Services.

Cluster manager 220 may comprise the following APIs:

```
Public interface ClusterManager {
    Public void addNodes(int count) throws IOException;
    Public void deleteNodes(collection<String>nodeIds) throws IOException;
    Public ClusterInfo getClusterInfo( ) throws IOException;
}
```

These APIs can be seen in FIG. 2. At reference numeral 251 API "getClusterInfo( )" can be seen interacting between Cluster Manager 220 and Auto-Scaling Cluster Manager 240. At reference numeral 254 API to addNodes( ) can be seen, and at reference numeral 255 the API to remove( ) nodes can be seen, each interacting between the Cluster Manager 220 and the Auto-Scaling Cluster Manager 240.

The system 20 may further comprise a module that may permit auto-scaling, even in a Presto environment. The Auto-Scaling Cluster Manager 240 may comprise a cluster state machine 245 that may capture the state of every node in the cluster. A cluster state machine 245 may provide information such as set forth in the Table below.

| Node_id | System_node_id (Nullable) | Started_at | Hostname | State |
|---|---|---|---|---|
| i-213231a | Presto-i-213231a | 2014-07-21 10:02:00 | Ip-10-12-13-41 | running |

Figure 3:
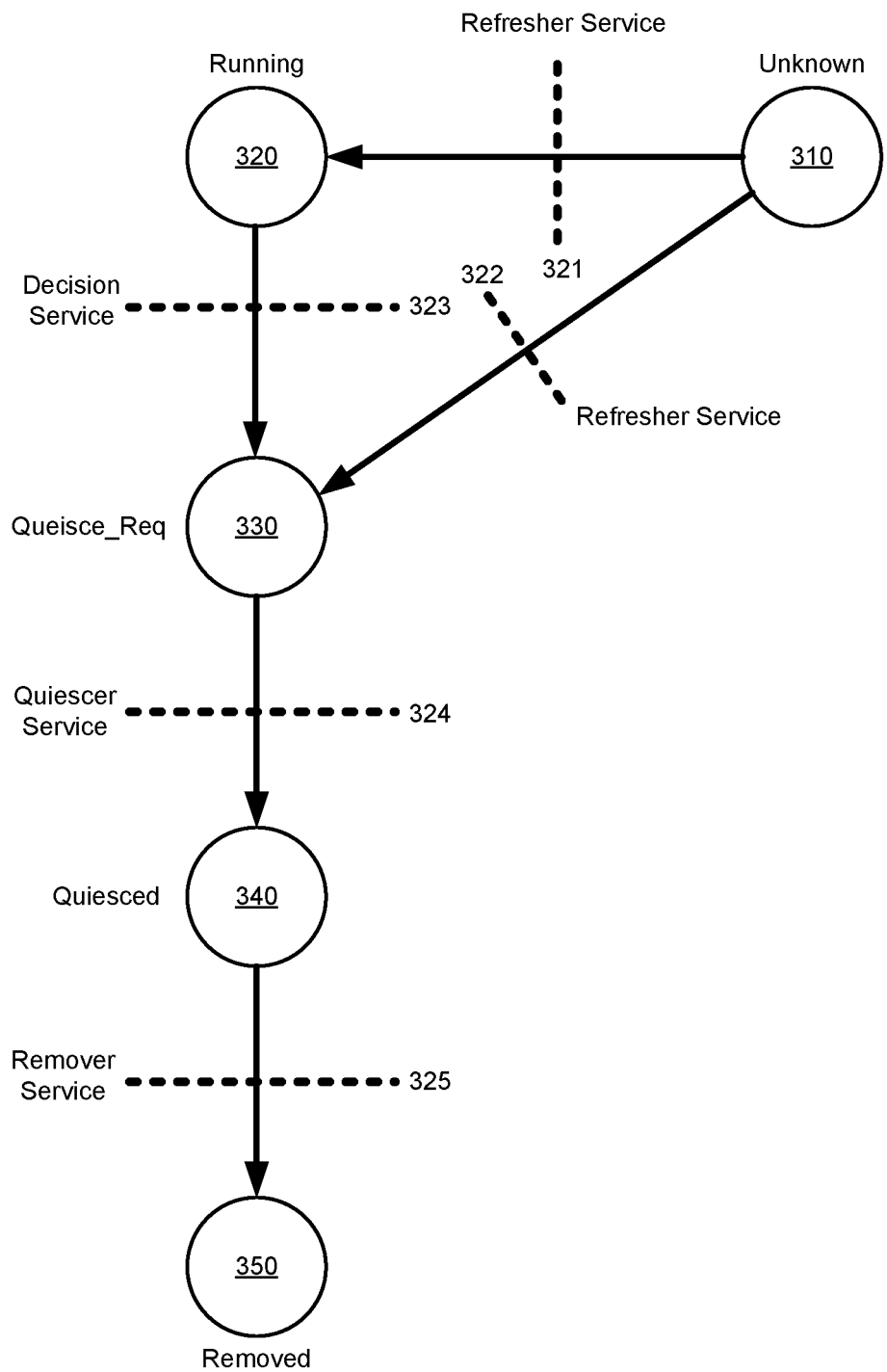
FIG. 3 depicts various transitions that a node may encounter in a cluster state machine in accordance with some embodiments of the present invention.

Note that the "state" in the table above is noted as "running." With reference to FIG. 3, it is noted that a node can be in any number of state transitions.

A node is considered Unknown (at reference numeral 310) if Cluster Manager 220 reports its existence, but Big Data system 210 does not know about it. If Big Data system 210 reports that it knows the node via a progress report, the node may be identified as being in the Running state (reference numeral 320). The RefresherService 321 is responsible for making such transitions. If a node is stuck in Unknown state for too long, the node may be deemed a bad node and may be transitioned to Quiesce_req (reference numeral 330) by the Refresher module (shown at reference numeral 241 in FIG. 2).

The DecisionService 323 may determine when additional nodes are necessary or desirable to scale up or when nodes can be let go. Often, the DecisionService When DecisionService 323 determines that a node is no longer necessary, it may change state of the node to Quiesce_req (reference numeral 330). In this manner, the Big Data system 210 may eventually finish all the work on that node. The Quiescer-Service 324 may transition nodes from Quiesce_req state (reference numeral 330) to Quiesced state (reference numeral 340) when a progress report indicates that the node is not doing any work.

A node in Quiesced state (reference numeral 340) may be picked up by RemoverService 325 which may call into ClusterManager.deleteNodes method to terminate the node.

Whenever a node is transitioned into Quiesce_req (reference numeral 330) state, this may be noted in an external file (hosts.quiesce_req). If the Auto Scaling Cluster Management service is restarted for any reason, it will relearn the nodes in this state. Because the Big Data System 210 may have started the procedure of quiescing nodes (in order to efficiently only utilize nodes when needed), the Auto Scaling Cluster management service must relearn the nodes where left off.

Note that in accordance with some embodiments of the present invention, when a node is quiesced, its state may be saved. Such state may be stored on the big data system itself, or to an external database (such as Amazon's Simple Storage Service ("3S")). In such situations, other nodes may be made aware of the alternate location of the saved data. Accordingly, some nodes may be discarded and reconstructed at a later point if required.

With reference to both FIGS. 2 and 3, the Auto Scaling Cluster Management 240 may further comprise a refresher module 241, which may periodically communicate with the Cluster Manager 220 in order to get information regarding clusters (i.e., getClusterInfo( )). The refresher module 241 may further check with the Big Data system 210 in order to identify new nodes and/or bad nodes, and transition nodes to states of (i) unknown; (ii) running; or (iii) quiesced_req, as discussed above with regard to FIG. 3. Refresher module 241 may perform the Refresher Service 321, 322, as set forth in FIG. 3.

With reference to both FIGS. 2 and 3, the Auto Scaling Cluster Management 240 may further comprise a Decision Service module 244. The decision service module 244 may determine the optimal number of nodes necessary at every point in time based on the rate of progress of the processing action (query, job, etc.) in the Big Data system 210.

Figure 4:
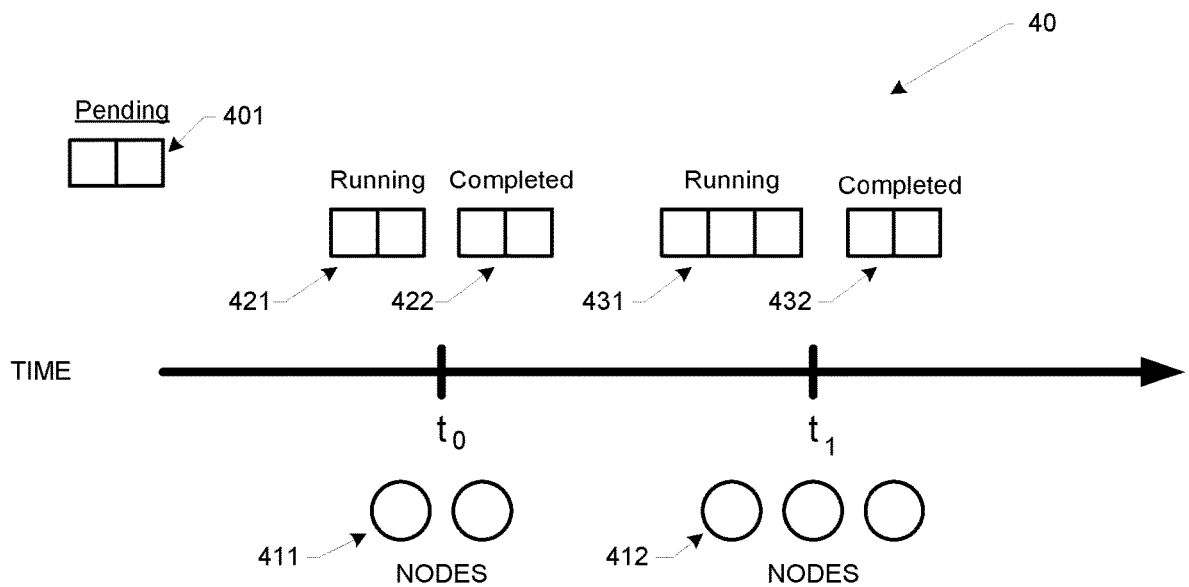
FIG. 4 illustrates an exemplary decision service module for determining the optimal number of nodes necessary at a point in time, in accordance with some embodiments of the present invention.

With reference to FIG. 4, the decision service module may be graphically depicted as reference numeral 40. Decision service 40 may note, at time $t_0$ that two (2) nodes 411 may be used. Such nodes may be running (as shown at 421), and may have completed two units of work (shown at 422). At time $t_1$, three (3) nodes 412 may be utilized, at which point three (3) nodes may be running (shown at 431) and may have completed three (3) units of work. Two (2) units of work may still be pending (shown at 401).

A completion rate per node may be calculated or determined for each task, or work ID:

$$CR(\text{completion rate}) = (t1.\text{pending} + t1.\text{running} - t0.\text{pending} - t0.\text{running})/(t1-t0)$$

$$N(\text{number of nodes}) = (t0.N + t1.N)/2$$

$$CRN(\text{completion rate per node}) = CR/N$$

The maximum number of optimal nodes necessary may be calculated across all works (or queries) to determine the optimal number of nodes in the cluster. Ignoring works where the completion rate is approximately zero (0) or where the work started less than five (5) seconds ago (since such work is too new to provide meaningful data as to completion rate per node). The optimal size is determined by a minimum and maximum of cluster settings.

With renewed reference to FIGS. 2 and 3, if the Decision Service Module 244 calculates an optimal size is greater than the current size, the cluster manager 220 may be requested for more nodes via the adder module 242. Alternatively, if the optimal cluster size is less than the current cluster size and a node is reaching an hour boundary, the decision service module 244 may call the quiescer 248 onto the identified node. This action may inform the Big Data system 210 to quiesce the node and transition the node into the Quiesce_Req state. Decision Service module 244 may perform the Decision Service 323, as set forth in FIG. 3.

The Auto Scaling Cluster Management module 240 may further comprise a quiescer module 246 and a remover module 243. The quiescer module 246 may perform the Quiescer Service 324 as set forth in FIG. 3. This Quiescer Service 324 may look at nodes in the Quiesce_Req state to determine if such nodes have any running units. If the nodes in the Quiesce_Req state do not have any running units, such nodes may be transitioned into the Quiesced state.

The remover module 243 may look for nodes in the Quiesced state and call cluster manager 220 to utilize its deleteNodes( ) function to terminate such nodes. This can be seen at 325 in FIG. 3. Note that in accordance with some embodiments of the present invention, the remover module 243 may group a number of nodes in a single call to the cluster manager 220.

With renewed reference to FIG. 2, the system 20 may further comprise Rest APIs 230. Rest APIs 230 may be utilized to (i) inspect the current state of the Auto-Scaling Cluster Manager 240, and (ii) manually add or quiesce nodes.

Figure 5:
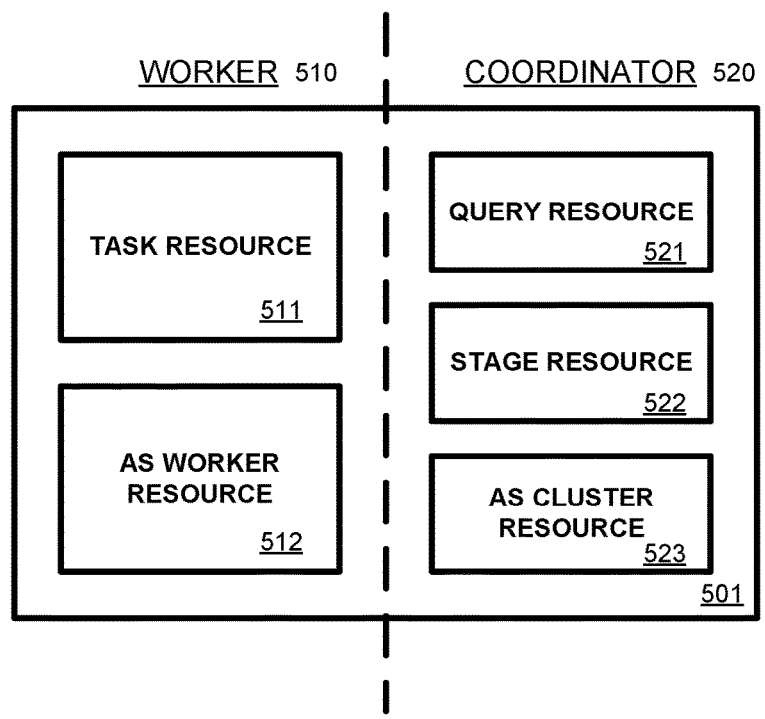
FIG. 5 illustrates potential components of a rest application program interface (API), in accordance with some embodiments of the present invention.

With reference to FIG. 5 the Rest APIs may comprise at least two resources, entitled ASCluster and AS Worker. Worker 510 may comprise a task resource 511, which may comprise Auto Scaling (AS) Worker Resource 512. This API may be summarized in the Table below.

| GET | /v1/asworker | Will return start-time, ip of a node. Can be used to return other information in the future. |
|---|---|---|

Coordinator 520 may comprise a query resource 521, stage resource 522, and auto-scaling (AS) cluster resource 523. The AS Cluster Resource may comprise the following APIs, summarized in the table below.

| GET | /v1/ascluster | State of ASCM |
|---|---|---|
| GET/POST | /v1/ascluster/add | Post Parameters may include the number of nodes. Get may fetch current requests in the add queue. |
| POST | /v1/ascluster/${nodeid}/quiesce_req | Transition node to Quiesce_requested status. |
| POST | /v1/ascluster/disable | Disable Auto-Scaling |

Restarts of systems and jobs may be problematic. Note that in accordance with some embodiments of the present invention, worker nodes can be restarted without issues, as they do not include an auto-scaling state. The coordinator function may restart with nodes being marked in the Unknown state. The Auto Scaling Cluster Management module may then review the current state of nodes by re-readhosts.quiesce_req, and accordingly restore the state of nodes that were marked as Quiesce_Req.

As noted above, the Auto Scaling Cluster Management module 240 works with Big Data systems 210, which may include, for example, those in a Presto or Hadoop environment. When the Auto Scaling Cluster Management module 240 works with Presto, the getProgressReport( ) and getClusterInfo( ) processes involve traversing existing data structures within Presto. However, the quiesce( ) function requires task-scheduling changes.

For example, if one or more nodes are being added, NodeScheduler.createNoteSelector may call into DiscoveryNodeManager (which is existing functionality in Presto) periodically in order to refresh the list of available nodes. New nodes may then start processing tasks from new queries, while running queries may only take advantage of new nodes at the source partitioned stages.

If nodes are not in a running state in a Presto environment, the DiscoveryNodeManager may be changed to filter out all nodes that are not in a running state. Accordingly, no new tasks will be assigned to such nodes.

A Presto task may move to a finished state only after its output has been completely consumed by ExchangeOperators upstream. Once the coordinator learns that a task is done (FINISHED, CANCELED, or FAILURE), the task is not polled again for its state. If all tasks in a Stage are complete, the Stage is marked as complete. Therefore, if a node has no tasks in PLANNING or RUNNING states, it is safe to remove the node.

When the Auto Scaling Cluster Management module 240 works with Hadoop, auto scaling requires coordination between the execution engine of Hadoop (MapReduce) and its storage system (Hadoop Distributed File System, or "HDFS"). A centralized process may keep track of all currently running tasks so that a progress report can be compiled from such data structures. The Quiesce( ) implementation is similar to that in a Presto environment—quiesced nodes are taken out of consideration for a Hadoop job.

Figure 6:
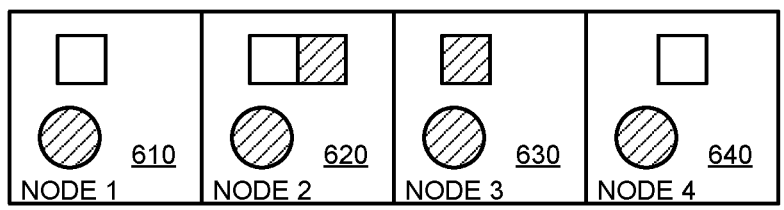
FIG. 6 illustrates an exemplary distributed file system where each node holds on to data blocks, in accordance with some embodiments of the present invention.

In the HDFS subsystem, each node holds on to data blocks. A data block is replicated any number of times to withstand failure of machines or disks. With reference to FIG. 6, a cross-hatched or shaded block may be replicated on two (2) nodes (node 2-620, node 3-630), while a white or unshaded block may be replicated on three (3) nodes (node 1-610, node 2-620, node 4-640). A node may only be quiesced when it does not contain any unique blocks—that is, when blocks are only present in such node. Similarly, a set of nodes may not be quiesced if there is no copy of the block outside of the set of nodes. This prevents unintended loss of data.

With continued reference to FIG. 6, Node 3-630 may be removed and taken out of action (since the same process is occurring at node 2), but node 2-620 and node 3-630 cannot be taken out of action at the same time because none of the other nodes contain the cross-hatched or shaded block.

The quiesce( ) implementation in this sub-system may ensure that such a block is copied over to one of the set of stable nodes. Stable nodes are never chosen or selected by the auto-scaling cluster manager for quiescing. The getProgressReport( ) implementation may return a number of blocks that are in the process of being copied out of the nodes.

Note that in accordance with some embodiments of the present invention, the techniques and systems described herein may be used to automatically scale multiple Big Data systems running on the same hardware. Similarly, some embodiments of the present invention can be utilized to automatically scale hardware in the presence of multiple big data systems. Accordingly, hardware may be running Hadoop, Presto, Spark, and/or any other type of data system, and may still be auto-scaled in the presence of such systems.

For example, a node may be running Hadoop worker and Presto worker. Because each Big Data system sends a progress report, it can be determined—using systems and methods in accordance with some embodiments of the present invention discussed above—if any of the Big Data systems are not making sufficient progress, or if a node is being under-utilized by any of the Big Data systems. If progress is not sufficient or adequate, more nodes can be added (i.e., upscaling). If a node is being under-utilized, then all of the Big Data systems using the node may be requested to quiesce the node. Once each of the Big Data systems (e.g., Hadoop and Presto) quiesce the node, the node can be removed (i.e., down-scaling). In this manner, the same mechanics discussed above can be utilized to automatically upscale or downscale a cluster with multiple Big Data systems.

It will be understood that the specific embodiments of the present invention shown and described herein are exemplary only. Numerous variations, changes, substitutions and equivalents will now occur to those skilled in the art without departing from the spirit and scope of the invention. Similarly, the specific shapes shown in the appended figures and discussed above may be varied without deviating from the functionality claimed in the present invention. Accordingly, it is intended that all subject matter described herein and shown in the accompanying drawings be regarded as illustrative only, and not in a limiting sense, and that the scope of the invention will be solely determined by the appended claims.

We claim:

1. A method for automatically scaling a big data system comprising:
    determining, at a first point in time, a first number of nodes for a cluster to process a request;
    assigning an amount of nodes equal to the first number of nodes to the cluster to process the request;
    determining, at a second point in time, a rate of progress of the request, and determining if the rate of progress is sufficient to meet an applicable service level agreement;
    determining, based on the rate of progress of the request, a second number of nodes for the cluster to process the request to meet the service level agreement; and
    modifying the amount of nodes assigned to the cluster to process the request to equal the second number of nodes;
    wherein, if the second number of nodes is less than the first number of nodes, further comprising:
    requesting a number of nodes, which equals to a difference between the first number of nodes and the second number of nodes, be quiesced;
    wherein the number of nodes includes nodes that are idle or are approaching a lease boundary;
    determining if a node of the number of nodes requested to be quiesced has completed any assigned processing or task; and
    upon a determination that the node requested to be quiesced has completed its assigned processing or task, terminating the node requested to be quiesced while other nodes in the cluster that are still processing continue to process;

upon a determination that the node requested to be quiesced has not completed any assigned processing or task, allowing the node requested to be quiesced to complete any assigned processing or task and then terminating the node from the cluster.

2. The method of claim 1, wherein the big data system automatically scaled is sharing hardware with a different type of big data system.

3. The method of claim 2, wherein types of big data system are selected from the group consisting of Hadoop, Presto, and Spark.

4. The method of claim 1, wherein it is determined that the rate of progress is insufficient to meet any applicable deadline or service level agreement, and wherein the second number of nodes is greater than the first number of nodes, further comprising:
calculating how many additional nodes are needed; and
assigning the additional nodes to the cluster to process the request.

5. The method of claim 1, wherein the step of determining when the node requested to be quiesced has completed any assigned processing or task comprises determining if the node requested to be quiesced has completed its assigned processing or task for any big data systems operating on the hardware.

6. A method for automatically scaling hardware used to process transactions for multiple big data systems running on the same hardware, comprising:
determining, at a first point in time, a first number of nodes for a cluster to adequately process a request;
assigning an amount of nodes equal to the first number of nodes to the cluster to process the request;
determining a rate of progress of the request;
determining at a second point in time and based on the rate of progress of the request, a second number of nodes for the cluster to process the request to meet an applicable service level agreement (SLA); and
modifying the amount of nodes assigned to the cluster to process the request to equal the second number of nodes, wherein:
if the second number of nodes is greater than the first number of nodes, assigning additional nodes to the cluster to process the request; or
if the second number of nodes is less than the first number of nodes, requesting a number of nodes, which equals to a difference between the first number of nodes and the second number of nodes, be quiesced;
wherein the number of nodes includes nodes that are idle or are approaching a lease boundary;
determining if a node of the number of nodes requested to be quiesced has completed any assigned processing or task for any of the big data systems operating on the hardware; and
if the node requested to be quiesced has not completed any assigned processing or task, allowing the node requested to be quiesced to complete any assigned processing or task before terminating the node requested to be quiesced from the cluster; or if the node requested to be quiesced has completed any assigned processing or task for any of the big data systems operating on the hardware, terminating the node requested to be quiesced from the cluster while other nodes in the cluster that are still processing continue to process.

7. The method of claim 6, wherein each of the big data systems determines whether it has enough nodes to meet the SLA relevant to each of the big data systems.

8. The method of claim 6 further comprising:
saving state of the node requested to be quiesced in an alternate location comprising a big data system of the big data systems, or an external data store; and
informing the other nodes of the alternate location.

* * * * *